Sept. 1, 1970  M. W. EVANS ET AL  3,526,445
SIGNAL LIGHT LENS
Filed March 4, 1968  3 Sheets-Sheet 1
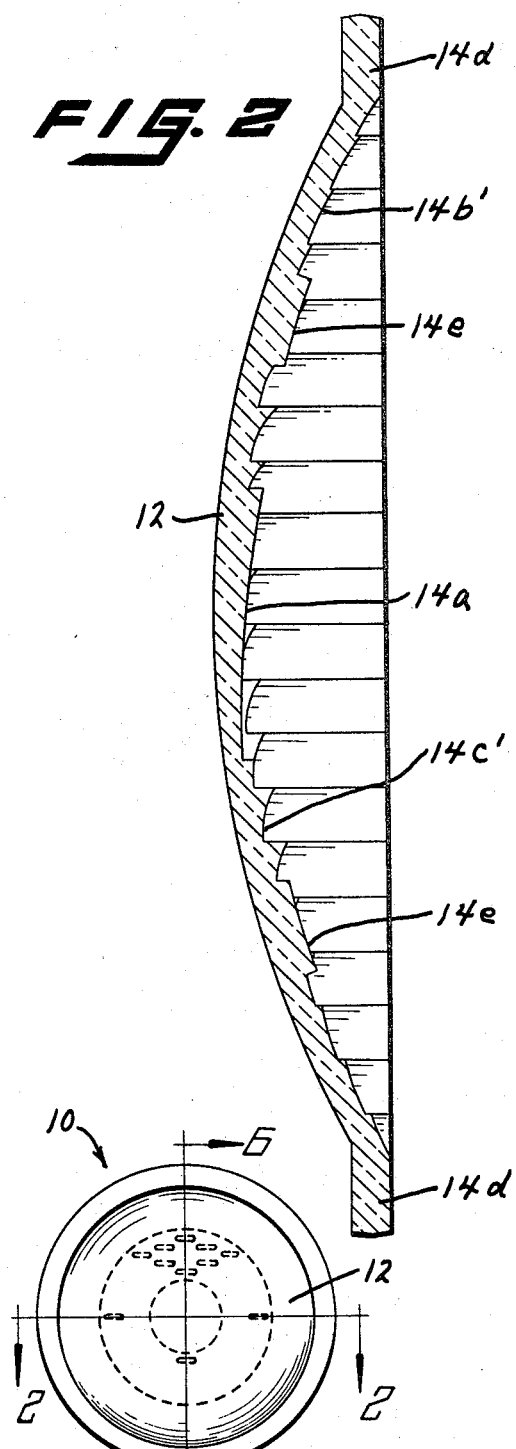
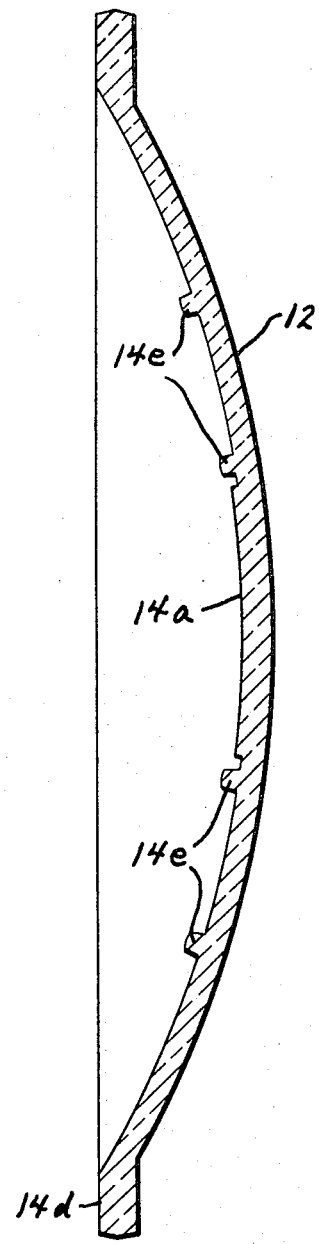
INVENTORS
MARION W. EVANS
JOHN R. MILES
BY *Warren D. Hackbert*
ATTORNEY

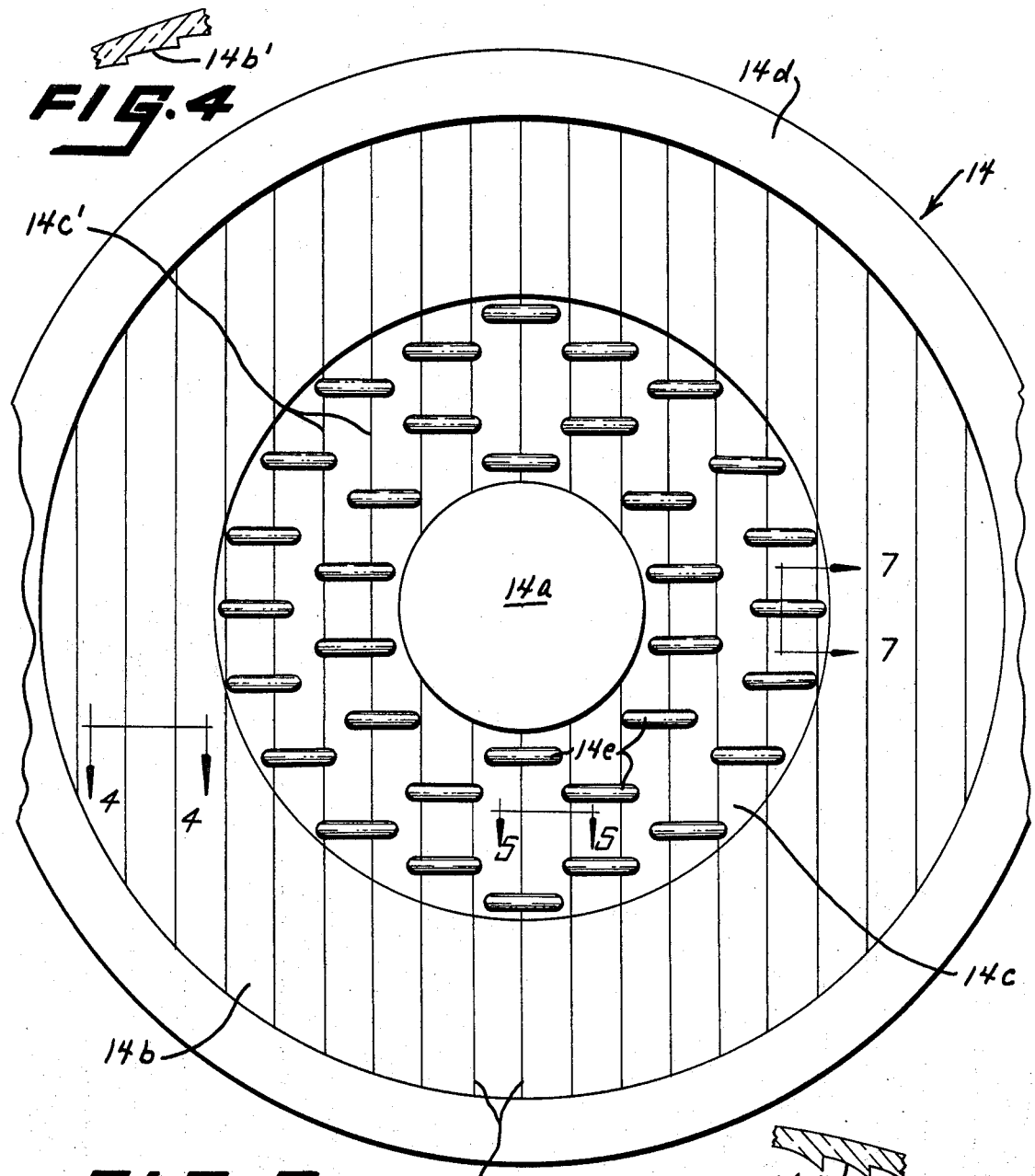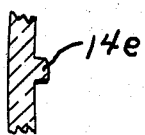

Sept. 1, 1970    M. W. EVANS ET AL    3,526,445
SIGNAL LIGHT LENS

Filed March 4, 1968    3 Sheets-Sheet 3

INVENTORS
MARION W. EVANS
JOHN R. MILES
BY
ATTORNEY

United States Patent Office 3,526,445
Patented Sept. 1, 1970

3,526,445
SIGNAL LIGHT LENS
Marion W. Evans, 2610 Washington Ave., Evansville, Ind. 47714, and John R. Miles, 830 Glenayre Drive, Glenview, Ill. 60025
Filed Mar. 4, 1968, Ser. No. 710,101
Int. Cl. G02b 17/02
U.S. Cl. 350—100    1 Claim

ABSTRACT OF THE DISCLOSURE

A signal light lens having a centrally disposed "bullseye" portion for transmitting a narrow beam of light at a far distance. An outer annular band is provided for transmitting a beam of light at an intermediate distance. An inner annular band is provided for transmitting a beam of light at a close distance. Raised segments are provided on the annular bands for transmitting a beam of light vertically.

---

As is evident, the existing type of lens used in a railroad crossing warning signal wastes a considerable amount of the light energy on unwanted areas. Usually, these lens emit a generally round, or curved, pattern of light, and as a warning signal standard is off the road, much of the emitted light falls in an area away from the road. In other words, while the signal light does perform a function, the light energy could be directed more effectively for even greater safety advantages.

The invention accomplishes such light orientation in a highly effective manner. Briefly, the lens of the invention has a unique rear surface configuration, serving to direct the light beam into various desired paths, one blending with another. The lens may be positioned either to the right or the left of the roadway, being interchangeable, to direct the light beam along the roadway towards the driver or pedestrian in a preselected safety pattern.

As will become apparent from the description herebelow, the rear surface of the lens of the invention is arranged into various portions for achieving different light transmitting results. In this connection, a centrally disposed or "bullseye" portion provides a narrow far extending beam of light, which does not widen until a considerable distance away from the signal. An outer annular band on the rear surface of the lens provides an intermediate distance road coverage beam, while an inner annular band provides a lesser distance road coverage beam. Raised bars or segments are provided for the directing of the light beam down onto the windshields of the oncoming vehicles, represented as down coverage. All of the preceding beams blend together, depending upon distance from the lens.

The invention should become more apparent from the following description, taken in conjunction with the accompanying drawings, wherein FIG. 1 is a view looking towards the front surface of the lens of the invention;

FIG. 2 is a view in horizontal section, taken at line 2—2 on FIG. 1 and looking in the direction of the arrows, showing certain details of the lens;

FIG. 3 is a view looking towards the rear surface of the lens of the invention;

FIG. 4 is a fragmentary view of a detail of the lens, taken at line 4—4 of FIG. 3 and looking in the direction of the arrows;

FIG. 5 is another fragmentary view of a detail of the lens, taken at line 5—5 of FIG. 3 and looking in the direction of the arrows;

FIG. 6 is a view in vertical section, taken at line 6—6 of FIG. 1 and looking in the direction of the arrows, showing further details of the lens;

FIG. 7 is still another fragmentary view of a detail of the lens, taken at line 7—7 of FIG. 3 and looking in the direction of the arrows; and, FIG. 8 is a plan view diagrammatically showing the selective beam coverage afforded by the invention.

Figure 8:
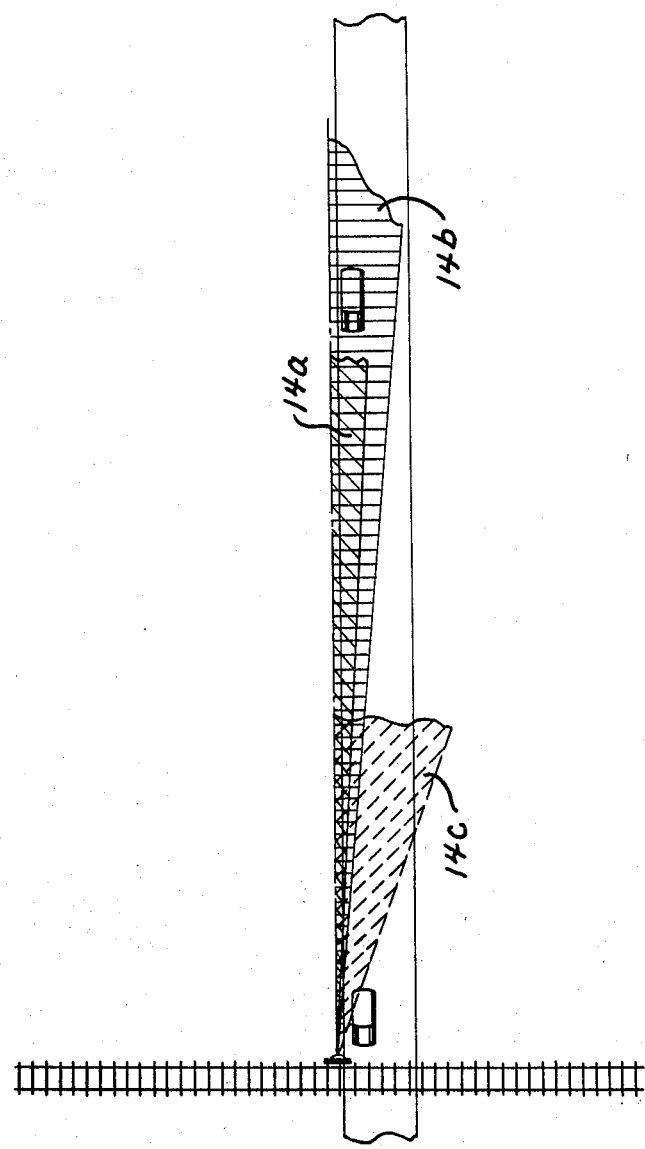

For the purposes of promoting an understanding of the principles of the invention, reference will now be made to the embodiment illustrated in the drawings and specific language will be used to describe the same.

Referring now to the figures, the lens 10 defining the invention has a smooth face or front surface 12 and a rear surface 14 arranged in portions or sections for different end purposes, to be described herebelow. In a typical embodiment of the invention, the lens 10 is made from a molded plastic material, as cellulose acetate butyrate, and is high impact resistant and lightweight.

In any event, the lens 10 has a central or "bullseye" portion 14a having a smooth rear surface and being so angled or deflected as to direct light passage towards the roadway. In other words, the back surface of the central portion 14a is angled vertically, being oriented in a direction facing the roadway (see FIG. 2). In one form of the invention, such angling is in the order of 3° to 6° with respect to a vertical plane normal to a vertical plane which divides the lens into equally sized parts. Central portion 14a provides for far distance light coverage.

A conventional rim 14d is disposed around the periphery of the lens, and an outer annular band or ring portion 14b is immediate such rim 14d. The outer annular ring portion 14b has a series of parallel extending grooves 14b' oriented to pass light in the direction of the roadway (see FIG. 4). In one form of the invention, the grooves 14b' are oriented at a 5° to 8° angle towards the roadway, such outer annular band providing an intermediate distance light coverage.

An annular band or ring portion 14c is provided between the central or "bullseye" portion 14a and the outer band 14b. The inner annular band 14c also includes a number of parallel grooves 14c' (see FIG. 5), in this instance being oriented, typically, at a 20° angle towards the roadway, such inner annular band 14c providing a shorter distance light coverage than the outer annular band 14b. As should be evident from a comparison of FIGS. 4 and 5, the grooves 14b' are more shallow than the grooves 14c', resulting in the aforesaid differences in light coverage.

The rear surface of the inner annular band 14c is completed through the use of a plurality of ridges 14e (FIGS. 3, 6 and 7), which serve to deflect the transmitted light upwardly and downwardly. Typically, the ridges 14e deflect the passage of light in a 10° range upwardly and a 10° range downwardly from a horizontal plane. Such light deflection is important in the instance of a vehicle approaching the signal standard, where the light is directed onto the windshield.

With reference to FIG. 8, a diagrammatic illustration is shown representing the function of each of the aforementioned light transmitting portions 14a, 14b and 14c. In this connection, the central or "bullseye" portion 14a transmits a light beam the farthest distance, which light beam blends into the light transmitted through outer annular band 14b, as the vehicle approaches the lens. As the vehicle more closely approaches the lens, the light blends into the light transmitted through inner annular band 14c, and, finally, when the vehicle is immediate the lens, the effect of the ridges 14e are of use.

It should be understood that the light transmitting portions 14a, 14b and 14c are oriented towards the roadway, i.e. causing the transmitted light beam to pass towards the direction of the roadway rather than in an unwanted area off the roadway. Thus, the invention provides for greater safety than the conventional lens for signal lights in use heretofore. In other words, the lens is customized for end safety purposes, utilizing its various portions to satisfy different end objectives.

I claim:
1. A lens having a smooth front surface and a plurality of light transmitting portions, comprising: a first light transmitting portion being circular and centrally disposed and defined by a smooth rear surface, said first transmitting light portion tapering laterally from one edge thereof to an opposite edge, whereby light is transmitted predominantly in one lateral direction, a second light transmitting portion being annular in configuration and vertically grooved on its rear surface to transmit light predominantly in said one lateral direction, a third light transmitting portion being in the form of an annular ring surrounded by said second light transmitting portion and vertically grooved on its rear surface whereby light is also transmitted predominantly in said one lateral direction, said third portion having raised segments disposed on the rear surface thereof in substantially horizontal planes, whereby light is deflected upwardly and downwardly, said vertical grooves in said second light transmitting portion are more shallow than said vertical grooves in said third light transmitting portion.

References Cited

UNITED STATES PATENTS

| | | | |
|---|---|---|---|
| 2,012,806 | 8/1935 | Brown et al. | 240—41.4 |
| 2,170,682 | 8/1939 | Frech et al. | 240—41.4 X |
| 2,177,216 | 10/1939 | Howard et al. | 240—41.4 X |
| 2,798,147 | 7/1957 | Orsatti | 350—101 X |
| 3,235,863 | 2/1966 | Lockhart | 240—106 X |

PAUL R. GILLIAM, Primary Examiner

U.S. Cl. X.R.

350—101; 240—41.3, 106; 340—383